3,702,311
HALODEHYDROGENATION CATALYST
William Q. Beard, Jr., Wichita, Kans., assignor to Ethyl
Corporation, New York, N.Y.
Filed July 14, 1969, Ser. No. 841,238
The portion of the term of the patent subsequent to
Jan. 26, 1988, has been disclaimed and dedicated to
the Public
Int. Cl. B01j 11/78
U.S. Cl. 252—441    7 Claims

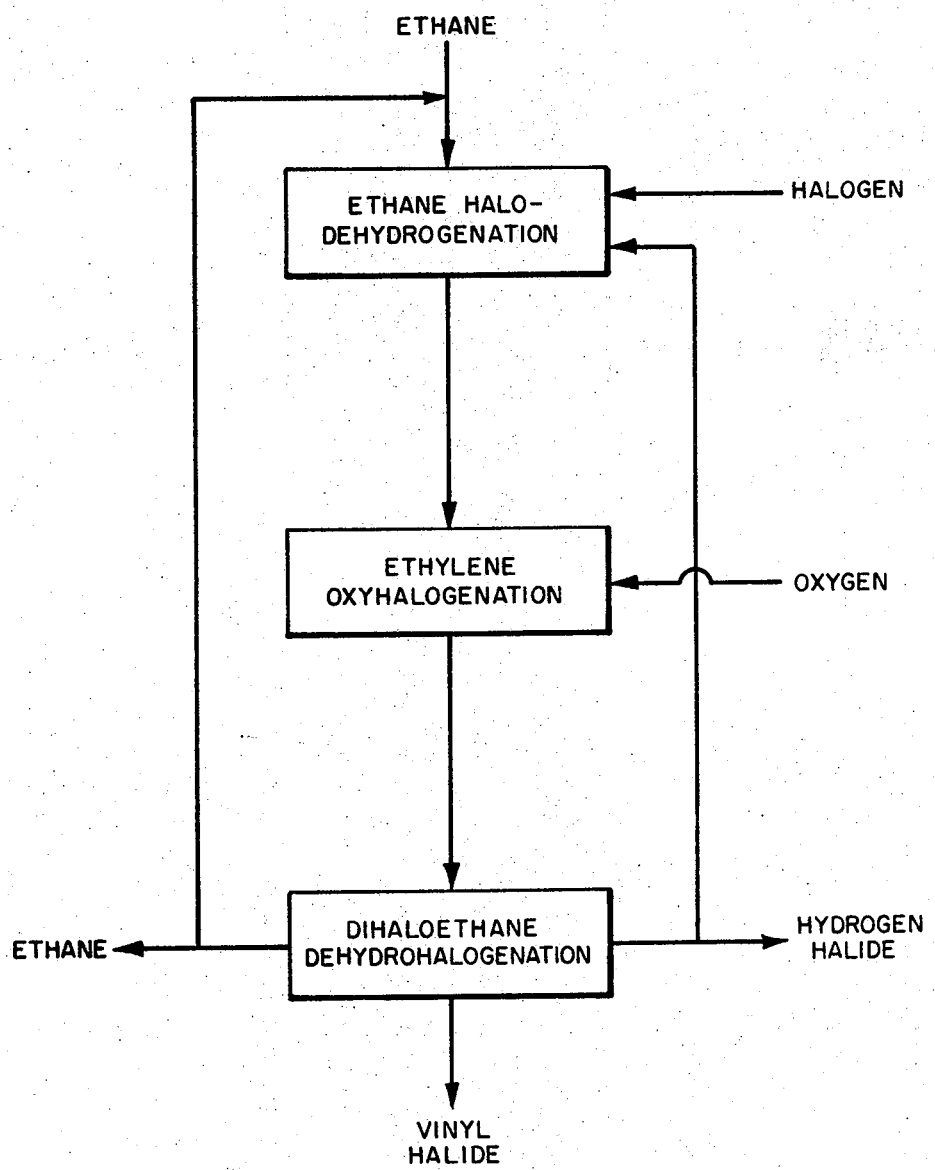

ABSTRACT OF THE DISCLOSURE

A supported catalyst for the halodehydrogenation of ethane to ethylene which contains: (a) copper halide and/or iron halide; (b) an alkali metal halide; (c) a rare earth halide; and (d) one of the following compounds: manganese halide, zinc halide, calcium halide or titanium halide.

BACKGROUND OF THE INVENTION

The present integrated process for the production of vinyl halide begins with the production of ethylene from ethane. Unsaturated hydrocarbons such as ethylene are commonly produced by either thermal cracking or catalytic cracking or a combination of both. In the known processes the principal advantage is low conversion of the saturated hydrocarbon to unsaturated hydrocarbon. In the literature, the reported conversion is rarely greater than about 40 percent. See, for instance, U.S. Pat. 3,119,883, U.S. Pat. 2,971,995 and British Pat. 969,416. It will be seen that product streams containing less than 30 percent of ethylene are not uncommon. In addition to low hydrocarbon conversion, the prior art processes often result in a product containing a variety of materials which are difficult to separate. For instance, in the case where ethane is the feed material substantial quantities of acetylene and methane are often produced. When ethylene is the desired product, serious problems are encountered due to the difficulty of separating these materials. Also, when a catalyst is employed in the known processes, experience has shown that periodic shutdown is necessary due to the fouling of the catalyst with tars and resins. Also, in many cracking operations exceeding high temperatures are often necessary, e.g. see U.S. Pat. 3,119,883.

A primary purpose of the present invention is the provision of a multi-step process for the production of vinyl halide beginning with the halodehydrogenation of ethane to ethylene and proceeding through the oxyhalogenation of the ethylene to 1,2-dihaloethane and the dehydrohalogenation of the 1,2-dihaloethane to vinyl halide, thereby enabling savings to be effected in one embodiment through recycling the hydrogen halide produced in the vinyl halide step back to the halodehydrogenation step.

Another primary purpose of this invention is to provide a unique process for the halodehydrogenation of ethane to produce ethylene wherein the conversion of ethane to ethylene is substantially increased. Other purposes are the provision of (1) a continuous halodehydrogenation process wherein shutdown due to catalyst fouling is avoided, (2) a halodehydrogenation process which does not require excessively high temperatures and (3) a halodehydrogenation process wherein the products formed are suitable for use in an oxyhalogenation process.

SUMMARY OF THE INVENTION

The present invention concerns a process for the halodehydrogenation of ethane to ethylene, the improvement comprising employing a hydrogen halide diluent with the halogen.

The invention further involves a process for the preparation of vinyl halide by cracking dihaloethane which has been prepared by oxyhalogenating ethylene which has been prepared by halodehydrogenating ethane, the improvement comprising recycling the hydrogen halide produced in the cracking to the halodehydrogenation.

In addition the invention provides a process for the preparation of vinyl halide by cracking diahaloethane which has been prepared by oxyhalogenating ethylene which has been prepared by halodehydrogenating ethane, the improvement comprising employing an excess of ethane in the halodehydrogenation and recycling the unreacted part of the excess from the cracking to said halodehydrogenation.

Even further the invention involves a supported catalyst for the production of ethylene by the halodehydrogenation of ethane in the presence of a halogen and a hydrogen halide diluent which comprises, in combination, from about 0.15 weight percent to about 3 weight percent of a metal halide selected from the group consisting of copper halide and iron halide, the weight percent being based on the total weight of said supported catalyst, and rare earth halide, the weight ratio of said rare earth halide to said metal halide being in excess of 1:1.

BRIEF DESCRIPTION OF THE DRAWING

The drawing shows a block diagram of the flow scheme of the present invention.

DESCRIPTION OF THE PREFERRED EMBODIMENTS

The above and other purposes are accomplished stepwise, first by a process for the halodehydrogenation of ethane and the production of ethylene by contacting ethane with a fluidized catalyst, halogen and a hydrogen halide diluent at a temperature above 350° C., or preferably from about 400° C. to about 650° C., and a pressure above atmospheric, or preferably from about one atmosphere to about 30 atmospheres, the fluidized catalyst being composed of a mixture containing essentially from about 0.15 percent to about 3.0 percent copper or iron halide and from about 5 percent to about 20 percent rare earth halides (hydrated) supported on a fluidized carrier, the perecntages being based on the total weight of catalyst and support. The weight percent of the rare halides as set forth herein is based on the hydrated form, although such halides need not be hydrated during use.

According to this process, ethane is converted to ethylene in yields as high or higher than 60 percent, without the occurrence of catalyst fouling or the necessity of the excessive temperatures normally associated with cracking operations. Furthermore, this method provides in one embodiment for the economical use of byproduct hydrogen halide, for example hydrogen chloride, which was at one time a troublesome by-product in the petrochemical industry and often disposed of by dumping into pits containing oyster shells, but is now in short supply and strong demand. Moreover, this process utilizes ethane, an abundant and inexpensive hydrocarbon, as a raw material for conversion into the more valuable chemical, ethylene, and eventually into the still more valuable chemical, vinyl halide.

The primary reason for these improved results in halodehydrogenation is the use of a fluidized, support mixture of copper or iron halide and rare earth halides. In all instances the ratio of rare earth halide (hydrated) to copper or iron halide must exceed 1:1 and should very preferably fall within the ranges hereinafter specified. Preferred conditions are (in weight percent based on the total amount of catalyst and support) a catalyst mixture supported on a fluidized solid carrier containing essentially from 0.15 to about 3.0 percent copper or iron halide and from about 5 percent to about 20 percent rare earth halides (hydrated). Preferably, the catalyst mixture contains from about 0.25 percent to about 0.35 percent copper halide or from about 0.3 percent to about 0.4 percent iron halide and from about 8 to about 15 percent rare earth halides (hydrated). When the amount of rare earth halide and copper or iron halide in the catalyst significantly deviates from that specified above, ethylene is not usually produced and, if produced at all, is produced in only small quantities. Instead, halogenated hydrocarbons are produced as the major product. This very significant relationship between the amount of copper or iron halide and rare earth halides will be apparent from the examples set forth below.

By the term "rare earth halide" is meant the halides of the elements in the lanthanum series, that is, elements having an atomic number of from 57 through 71, and mixtures of these compounds. Included among the rare earth elements are thulium, lanthanum, cerium, praseodymium, neodymium, prometheum, samarium, europium, gadolinium, terbium, dysprosium, holmium, erbium, ytterbium, lutecium, yttrium. Among the elements cerium is preferred, but praseodymium and neodymium are also excellent catalyst components for the present process. However, since these materials are usually found in nature in mixtures, it is very convenient to use a commercially available mixture. The mixtures used in formulating the catalyst contain rare earth halides, preferably chlorides, or oxides or other mixtures. Examples of minerals containing the rare earths are zircon, thorite, monazite, gadolinite, cerite, orthite, and the like. The mixture known in the art as didymium is suitable, but the mixture extracted from monazite without removal of cerium and thorium is preferred.

The temperature of the halodehydrogenation process should be above 350° C. and should preferably range from about 400° C. to about 650° C. and more preferably from about 475° C. to about 600° C. It is desirable that the pressure range from about 1 atmosphere to about 30 atmospheres and preferably from about 1 atmosphere to about 20 atmospheres.

The fluidized support for the halodehydrogenation catalyst may be any of the known inert carriers such as sand, diatomaceous earth, alumina, silica gel, pumice, bauxite, chromia-alumina, and the like. Preferably the catalyst support is chromia-alumina, but alumina and silica are highly satisfactory. It is also highly preferable that the particle size of the impregnated catalyst be within the range of from about 120 mesh to about 325 mesh (U.S. Sieve number). In other words, the preponderance of the catalytic material should be no coarser than about 120 mesh and no finer than about 325 mesh. There is no catalytic material should be no coarser than about 120 mesh and no finer than about 325 mesh. There is no necessity that all particles be of uniform size. The size distribution generally varies throughout the ranges indicated. Usually, it is preferred that not more than about 90 percent of the catalyst be finer than 325 mesh and that no more than about 50 percent of the catalyst be coarser than 120 mesh.

The temperature of the halodehydrogenation process should be above 350° C. and should preferably range from about 400° C. to about 650° C. and more preferably from about 475° C. to about 600° C. It is desirable that the pressure range from about 1 atmosphere to about 30 atmospheres and preferably from about 1 atmosphere to about 20 atmospheres.

The fluidized support for the halodehydrogenation catalyst may be any of the known inert carriers such as sand, diatomaceous earth, alumina, silica gel, pumice, bauxite, chromia-alumina, and the like. Preferably the catalyst support is chromia-alumina, but alumina and silica are highly satisfactory. It is also highly preferable that the particle size of the impregnated catalyst be within the range of from about 120 mesh to about 325 mesh (U.S. Sieve number). In other words, the preponderance of the catalytic material be no coarser than about 120 mesh and no finer than about 325 mesh. There is no necessity that all particles be of uniform size. The size distribution generally varies throughout the ranges indicated. Usually, it is preferred that not more than about 90 percent of the catalyst be finer than 325 mesh and that no more than about 50 percent of the catalyst be coarser than 120 mesh.

If desired, an alkali metal halide may be added to the halodehydrogenation catalyst mixture in a concentration of from about 0.01 percent by weight to about 5 percent by weight, based on the total weight of catalyst and support. Preferably, it is added in concentrations of about 0.05 percent to about 3 percent, and more preferably from about 0.1 to about 2 percent. The alkali metal halides employed are preferably the halides of lithium, sodium, potassium, rubidium and cesium. The addition of alkali metal halide to the catalyst mixture is a preferred embodiment of the invention, and among the alkali metal halides, lithium halide is most preferred.

Other halodehydrogenation catalyst additives also enhance the performance of the catalyst of this invention. Among such additives, manganese halide in a concentration of from about 1 to about 10 percent by weight, based on the total weight of catalyst and support, is preferred. Other suitable additives include zinc halide, calcium halide, and titanium halide, among which calcium halide is preferred in a concentration of from about 1 to about 10 percent by weight, based on the total weight of catalyst and support.

The addition of iron halide to the copper halide containing catalyst, or vice versa, has also been found beneficial, depending upon the type and quantity of other components in the catalyst. A concentration of iron or copper halide additive of from about 1 to about 10 weight percent, based on the total weight of catalyst and support, is preferred.

Another important feature of the halodehydrogenation step of this invention is the molar feed ratio ethane/halogen/hydrogen halide which preferably varies in the ranges of 1/1 to 2/1 to 4.

The rate of flow of gases through the reaction zone is subject to some variation. Thus, sufficient flow of gases must be provided for fluidization of the supported catalyst. On the other hand, gas flow should not be so extreme as to blow significant quantities of the catalyst out of the reaction zone. It is generally preferable that the superficial linear velocity of the gases entering the reactor be maintained within a range of from about 0.1 to about 5 feet per second. More preferably, for reasons of economy, the superficial linear velocity is maintained from about 0.5 feet per second to about 3.5 feet per second. A suitable contact time is one ranging from about 1 second up to about 20 seconds, and preferably, for best conversion, the contact time should be from about 2 to about 15 seconds.

The halodehydrogenation feed ethane, halogen and hydrogen halide may be fed together into the bottom of the reactor. This can be varied however, and it is indeed often desirable to do so. For instance, two of the reactants are fed into one portion of the reaction zone and the other reactant into another portion.

As shown in the flow scheme depicted in the drawings, the above described ethane halodehydrogenation is the first of a three-step process for producing vinyl halide. One embodiment of this process requires the recycle of part or all of the hydrogen halide from the last step to the first. Another embodiment requires feeding an excess of ethane to the first step in order to react all halogen therein, whereby enough ethylene and hydrogen halide are produced for the oxyhalogenation step. Therefore, in this latter embodiment none, part, or all of the hydrogen halide may be recycled from the last step to the first, while the excess ethane which passes unreacted through the second and third steps may be partly or completely recycled to the first step. As evident, where no hydrogen halide is recycled, the hydrogen halide diluent in the halodehydrogenation may all be produced in situ. Thus, the process envisions complete flexibility with regard to ethane and hydrogen halide recycle so that none, part, or all of either stream may be recycled or sent elsewhere as economy and balance with other facilities and processes dictate.

While the ethane halodehydrogenation process above described is unique, conventional processes known in the art are suitable for the oxyhalogenation and dehydrohalogenation (or thermal cracking) steps. However, according to a preferred embodiment a mixture of from about 1 to about 50 weight percent ethane, from about 40 to about 95 percent ethylene, and from about 20 to about 40 weight percent hydrogen halide are passed from the ethane halodehydrogenation step to the oxyhalogenation reactor wherein there is maintained a pressure of from about 50 to about 250 p.s.i.g. and a temperature of from about 200 to about 400° C. The reactants are passed through a supported metal halide catalyst which is maintained in a fluidized state by a reactant flow rate of from about 0.2 to about 2 feet per second at reaction temperature. Contact time is maintained between about 1 and about 20 seconds. Operating under these conditions, from about 60 to about 99 percent conversion of ethylene to 1,2-dihaloethane is achieved.

Also according to a preferred embodiment, the product mixture from the oxyhalogenation step which includes from about 50 to about 90 percent 1,2-dihaloethane, from about 1 to about 20 weight percent ethane, and from about 5 to about 20 weight percent hydrogen halide is passed to a dehydrohalogenation furnace wherein is maintained a temperature of from about 400 to about 600° C. and a pressure of from atmospheric to about 200 p.s.i.g. Operating in this fashion, a conversion of 1,2-dihaloethane to vinyl halide of from about 60 to about 90 weight percent is achieved. The vinyl halide is separated from the hydrogen halide by quench and distillation. Uncracked dihaloethane is recycled back to the furnace.

In the following examples, which are intended to be descriptive rather than restrictive, ethane, halogen, and hydrogen halide were fed into the bottom of a vertically elongated reaction vessel precharged with a fluidizable catalyst. The catalyst compositions are in weight percent, based on the total weight of catalyst and support. The weight percent of the rare earth halides component (including cerium halide and didymium halide) is calculated on the basis of its hydrated form, although during use, it is not necessary fully or even partially hydrated.

Example VI

The preceding examples are repeated so that each example includes runs which differ in the use of the following iron chloride concentrations where copper chloride is already employed or copper chloride where iron chloride is already employed (in weight percent based on the total weight of catalyst and support): 1, 3, 5, 7, 10.

Example VII

The preceding examples are repeated so that each example includes runs which differ with regard to use of cerium chloride, didymium chloride, or rare earth chlorides extracted from monazite without removal of cerium or thorium, each in the following concentrations (in weight percent, based on the total weight of support and hydrated catalyst): 0.01, 0.1, 1, 5, 10, 15, 20, 25. Cerium chloride performs best, and optimum results therefor are indicated to be between 5 and 15 weight percent.

Example VIII

The preceding examples are repeated so that each example includes runs which differ with regard to use of lithium chloride, sodium chloride, potassium chloride, rubidium chloride or cesium chloride, each in the following concentrations (in weight percent, based on the total weight of catalyst and support): 0.01, 0.05, 0.1, 0.5, 1, 2, 5, 10. Lithium chloride performs best, and optimum results therefor are indicated to be between 0.5 and 2 weight percent.

Example IX

The preceding examples are repeated so that each example includes runs which differ with regard to use of manganese chloride, calcium chloride, zinc chloride or titanium chloride, each in the following concentrations (in weight percent, based on the total weight of catalyst and support): 0.01, 1, 5, 10, 20. Manganese chloride performs best, with calcium chloride being better than either zinc chloride or titanium chloride; optimum results for both manganese chloride and calcium chloride are indicated to be between 1 and 10 weight percent.

Example X

The preceding examples are repeated so that each example includes runs at the following temperatures: 300° C., 350° C., 650° C. and 700° C. Optimum results are indicated to be between 350° C. and 650° C.

Example XI

The preceding examples are repeated so that each example includes runs which differ with regard to use of the following catalyst supports: sand, diatomaceous earth,

| Example | I | II | III | IV |
|---|---|---|---|---|
| Molar feed ratio: Ethane/Cl$_2$/HCl | 1/1/2 | 1/1.03/2 | 1/1/2 | 1/1/2.8 |
| Catalyst composition (wt. percent): | | | | |
| CuCl$_2$ | 0.30 | 0.30 | 0.30 | 0.30 |
| Rare earth Cl (hydrated) | 10.0 | 10.0 | 10.0 | 10.0 |
| LiCl | 0.06 | 0.06 | 0.06 | 0.06 |
| Catalyst support | Alumina | Alumina | Alumina | Alumina |
| Temperature (° C.) | 575 | 525 | 575 | 550 |
| Pressure (atm.) | 1 | 1 | 1 | 1 |
| Ethane conversion (percent) | 74.4 | 72.6 | 65.9 | 72.0 |
| Ethylene yield (percent) | 84.5 | 82.8 | 75.9 | 83.2 |

Example V

The preceding examples are repeated so that each example includes runs which differ with regard to use of the following copper chloride or iron chloride (substituted for copper chloride) concentrations (in weight percent, based on the total weight of catalyst and support): 0.01, 0.05, 0.1, 0.15, 0.2, 0.25, 0.3, 0.35, 0.4, 0.45, 0.5, 1.0, 5.0, 10.0. Optimum results are indicated to be between 0.25 and 0.35 weight percent for copper chloride and 0.3 to 0.4 weight percent for iron chloride.

alumina, silica gel, pumice, bauxite, or chromia-alumina. Chromia-alumina performs best, with alumina and silica gel being better than the other supports.

Example XII

The preceding examples are repeated so that each example includes runs which differ with regard to the following pressures (in atmospheres): 2, 5, 10, 13, 15, 20, 30.

Example XIII

The preceding examples are repeated so that each example includes runs which differ with respect to the molar feed ratio ethane/chlorine/hydrogen chloride: 1/0.1/2, 1/2/2, 1/0.1/0.1, 1/2/4, 1/1/4, 1/1/0.1, 1/1/0.

Example XIV

The preceding examples are repeated, first, omitting the rare earth chlorides and, second, employing the following concentrations of iron chloride or copper chloride and rare earth chlorides (in weight percent, based on the total weight of catalyst and support): (1) 4 percent iron chloride or copper chloride and 3 percent rare earth chlorides, (2) 10 percent iron chloride or copper chloride and 0.5 percent rare earth chlorides, (3) 15 percent iron chloride or copper chloride and 0.15 percent rare earth chlorides. In each instance low yields of ethylene are experienced.

Example XV

The preceding examples are repeated, first, changing the chlorine to bromine, the hydrogen chloride to hydrogen bromide, and the metal chlorides to metal bromides; and second, changing the chlorine to iodine, the hydrogen chloride to hydrogen iodide, and the metal chlorides to metal iodides. Good results are experienced except with Example XIV.

Example XVI

The product mixtures from the preceding examples (except Example XIV) are passed into the bottom of a vertically elongated reactor containing a copper halide catalyst supported on alumina. Oxygen is also admitted to the reactor. The catalyst is fluidized by a reactant flow rate of 0.5 foot per second at a reaction temperature of 300°C. and 150 p.s.i.g. to establish a contact time of 5 seconds. 1,2-dihaloethane is produced in good yield.

Example XVII

The product mixtures from Example XVI are passed into a cracking furnace at a temperature of 350° C. and 100 p.s.i.g. The product of vinyl halide, hydrogen halide, ethane, and unreacted dihaloethane from the furnace is quenched and distilled, the unreacted dihaloethane is recycled to the furnace, the hydrogen halide is recycled to the halodehydrogenation processes respectively set forth in the preceding examples, and the vinyl halide is recovered as product.

Example XVIII

Example XVII is repeated except the hydrogen halide is not recycled while the ethane is recycled to the halodehydrogenation.

Example XIX

Example XVII is repeated and the ethane is recycled to the halodehydrogenation.

While the catalytic mixtures of this invention can be deposited upon the fluidized solid support in a number of different ways, a very simple and highly preferred method of impregnating the support is to dissolve in water or an alcohol a weighed amount of the components of the catalyst mixture. A weighed amount of the support is then added to the water or alcohol and the contents stirred until completely homogenous. The water or alcohol is then evaporated at low temperatures from the so-formed slurry. The evaporation is conveniently done by drying at a low temperature, e.g. about 100° C., in a low temperature air circulating oven. The dry impregnated support remaining can then be employed in the process of this invention.

I claim:

1. A supported catalyst for the production of ethylene by the halodehydrogenation of ethane in the presence of a halogen and a hydrogen halide diluent which consists essentially of:
   (a) from about 0.15 weight percent to about 3 weight percent of a metal halide selected from the group consisting of copper halide and iron halide;
   (b) from about 0.01 to about 5 weight percent of an alkali metal halide;
   (c) from about 1 to about 10 weight percent of a compound selected from the group consisting of manganese halide, zinc halide, calcium halide, and titanium halide; and
   (d) a rare earth halide, the weight ratio of said rare earth halide to said metal halide being in excess of 1:1, all concentrations being based upon the total weight of the supported catalyst.

2. The catalyst of claim 1 wherein said alkali metal halide is lithium halide.

3. The catalyst of claim 1 wherein the metal halide is copper halide and wherein the catalyst additionally contains from about 1 to about 10 weight percent iron halide.

4. The catalyst of claim 1 wherein the metal halide is iron halide and wherein the catalyst additionally contains from about 1 to about 10 weight percent copper halide.

5. The catalyst of claim 1 wherein the metal halide is iron halide.

6. The catalyst of claim 1 further characterized by said rare earth halide being present in a concentration of from about 5 to about 20 weight percent in its hydrated form, based on the total weight of said supported catalyst.

7. The catalyst of claim 1 further characterized by the support being selected from the group consisting of chromia-alumina, alumina and silica gel.

References Cited

UNITED STATES PATENTS

| | | | |
|---|---|---|---|
| 2,204,733 | 6/1940 | Miller | 252—441 X |
| 2,838,577 | 6/1958 | Cook et al. | 260—656 R |
| 2,914,575 | 11/1959 | Feathers et al. | 260—659 A X |
| 3,210,431 | 10/1965 | Engel | 252—441 X |
| 3,217,064 | 11/1965 | McGreevy et al. | 260—683.3 |
| 3,230,181 | 1/1966 | Lester | 252—441 |
| 3,291,846 | 12/1966 | Otsuka et al. | 252—441 X |
| 3,324,046 | 6/1967 | Diprose | 252—441 |
| 3,427,359 | 2/1969 | Rectenwald et al. | 252—441 X |
| 3,527,819 | 9/1970 | Berkowitz et al. | 252—441 X |
| 3,558,735 | 1/1971 | Beard | 260—683.3 |

PATRICK P. GARVIN, Primary Examiner

U.S. Cl. X.R.

260—656 R; 677 X A; 683.3

PO-1050
(5/69)

UNITED STATES PATENT OFFICE
CERTIFICATE OF CORRECTION

Patent No. 3,702,311     Dated  November 7, 1972

Inventor(s)   William Q. Beard, Jr.

It is certified that error appears in the above-identified patent and that said Letters Patent are hereby corrected as shown below:

Column 1, line 45, reads "exceeding", should read -- exceedingly -- . Column 2, line 46, reads "rare halides", should read -- rare earth halides -- . Column 2, line 64, reads "support", should read -- supported -- . Column 3, line 19, reads "compounds,", should read -- compounds. -- . Column 3, line 52, reads "material should be", should read -- material be -- . Column 3, lines 53, 54 and 55, the sentence beginning "There is no" should be deleted. Column 7, line 34, reads "foot", should read -- feet -- .

Signed and sealed this 10th day of April 1973.

(SEAL)
Attest:

EDWARD M. FLETCHER, JR.
Attesting Officer

ROBERT GOTTSCHALK
Commissioner of Patents